(12) United States Patent
Li et al.

(10) Patent No.: US 9,126,834 B2
(45) Date of Patent: Sep. 8, 2015

(54) HYDROGEN STORAGE MATERIALS

(75) Inventors: Wen Li, El Segundo, CA (US); Adam F. Gross, Santa Monica, CA (US); Alan J. Jacobsen, Woodland Hills, CA (US); John J. Vajo, West Hills, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 719 days.

(21) Appl. No.: 12/615,524

(22) Filed: Nov. 10, 2009

(65) Prior Publication Data

US 2011/0111954 A1    May 12, 2011

(51) Int. Cl.
| | |
|---|---|
| C01B 31/02 | (2006.01) |
| B82Y 30/00 | (2011.01) |
| C01B 3/00 | (2006.01) |
| B01J 20/20 | (2006.01) |
| B01J 20/02 | (2006.01) |

(52) U.S. Cl.
CPC ............. *C01B 31/02* (2013.01); *B01J 20/0203* (2013.01); *B01J 20/20* (2013.01); *B82Y 30/00* (2013.01); *C01B 3/0021* (2013.01); *C01B 3/0026* (2013.01); *C01B 3/0031* (2013.01); *C01B 3/0036* (2013.01); *C01B 3/0042* (2013.01); *C01B 3/0047* (2010.10); *C01B 3/0057* (2013.01); *C01B 3/0068* (2013.01); *C01B 3/0084* (2013.01); *Y02E 60/325* (2013.01); *Y02E 60/327* (2013.01)

(58) Field of Classification Search
CPC ....................................................... C01B 31/02
See application file for complete search history.

(56) References Cited

U.S. PATENT DOCUMENTS

| | | | |
|---|---|---|---|
| 4,187,092 A | 2/1980 | Woolley | |
| 4,292,265 A | 9/1981 | Ron et al. | |
| 4,507,263 A | 3/1985 | Ron | |
| 6,274,288 B1 | 8/2001 | Kewitsch et al. | |
| 6,342,198 B1 | 1/2002 | Zaluska et al. | |
| 6,596,055 B2 * | 7/2003 | Cooper et al. | 95/116 |
| 7,094,276 B2 * | 8/2006 | Kojima et al. | 96/153 |
| 7,382,959 B1 | 6/2008 | Jacobsen | |
| 2006/0237688 A1 | 10/2006 | Zimmermann | |
| 2006/0264324 A1 * | 11/2006 | Schuth et al. | 502/400 |
| 2007/0292732 A1 | 12/2007 | Feaver et al. | |

FOREIGN PATENT DOCUMENTS

| | | |
|---|---|---|
| DE | 69629462 | 2/2004 |
| DE | 10332438 | 4/2005 |
| WO | 2010049649 | 5/2010 |

OTHER PUBLICATIONS

Jun, 'Synthesis of New, Mesoporous Carbon with Hexagonally Ordered Mesostructure' in JACS vol. 122 pp. 10712-10713 (2000).*
M. Ron et al., Preparation and Properites of Porous Metal Hydride Compacts; Journal of Less-Common Metals; 74 (1980) pp. 445-448.
Y. Josephy et al., Hydrogen and Thermal Yields of Porous Metal Matrix Hydride Compacts of MmNi4.15Fe0.85Hx; Journal of the Less-Common Metals, 104 (1984) pp. 297-305.

(Continued)

*Primary Examiner* — Stuart Hendrickson
(74) *Attorney, Agent, or Firm* — BrooksGroup (57) ABSTRACT

A hydrogen storage material has been developed that comprises a metal hydride material embedded into a carbon microstructure that generally exhibits a greater bulk thermal conductivity than the surrounding bulk metal hydride material.

33 Claims, 4 Drawing Sheets

(56) References Cited

OTHER PUBLICATIONS

Adelhelm, Philipp; De Jongh, Petra E.; The Impact of Carbon Materials on the Hydrogen Storage Properties of Light Metal Hydrides; Journal of Materials Chemistry (2001). 21(8), 2417-2427.

German Office Action dated Aug. 9, 2011; Application SN: G15732PDE-Sh/Sd; Applicant: GM Global Technology Operations LLC; 5 pages.

Chinese Office Action dated Dec. 10, 2014; Application No. 201110056061.6; Applicant: GM Global Technology Operations LLC. ; 6 pages.

* cited by examiner

HYDROGEN STORAGE MATERIALS

TECHNICAL FIELD

The technical field relates generally to hydrogen storage materials and methods of making and using same.

BACKGROUND

The use of hydrogen as a possible fuel source for a wide range of devices has prompted much research into hydrogen storage and delivery technologies. One current hydrogen storage approach involves the use of storage tanks that contain one or more metals (including alloys) capable of reacting with gaseous hydrogen to reversibly form metal hydride compounds. The reversible storage and release of hydrogen gas by way of metal-hydride forming metals enables hydrogen to be stored in greater quantities per unit volume than is normally possible by storing hydrogen gas in a pressurized vessel under standard hydrogen storage conditions. A particular goal of this hydrogen storage technology, moving forward, is to store useful amounts of hydrogen so that a hydrogen-consuming device can be operated over a sufficient period of time without the need to constantly replenish its hydrogen fuel reserves. Efforts are also currently underway to try and supply hydrogen gas to a hydrogen-consuming device at modest temperature and pressure conditions in order to eliminate some rather complex and expensive auxiliary equipment that may otherwise be needed.

The sorption of hydrogen gas to form metal hydride compounds is generally an exothermic reaction that often requires the removal and dissipation of at least some of the heat generated so that further hydrogen sorption is not inhibited. Conversely, the desorption of hydrogen gas from the metal hydride compounds is generally an endothermic reaction that may require a fast and/or continuous input of heat to drive the reaction and liberate hydrogen gas at a sufficient rate. The ability to effectively transfer heat to and from the metal hydride compounds is thus a factor that contributes to their overall bulk hydrogen storage capacity and, in turn, directly impacts the frequency at which hydrogen gas must be recharged to the tank or vessel containing the metal-hydride compounds.

The development of improved hydrogen storage materials for the storage of hydrogen gas is therefore currently in demand.

SUMMARY OF EXEMPLARY EMBODIMENTS

One exemplary embodiment of the invention includes a product having a carbon microstructure that has an open-cellular framework defined at least in part by a plurality of carbon segments that form repetitive and integrated unit cells such that the carbon microstructure has on open volume in the range of about 70 percent to about 95 percent. A metal hydride may be embedded into the open volume of the carbon microstructure. The carbon microstructure may be more thermally conductive than the metal hydride material.

Another exemplary embodiment of the invention includes a product having a carbon microstructure that has an open-cellular framework defined at least in part by a plurality of carbon segments that interpenetrate at spaced apart and aligned nodes to form a three-dimensional microtruss having repetitive and integrated unit cells. The carbon microstructure may comprise at least 90 weight percent vitreous carbon based on the total weight of the carbon microstructure. The unit cells of the three-dimensional microtruss may include four carbon segments that interpenetrate at one of the nodes to form opposed quadrilateral pyramidal halves. The plurality of carbon segments may have a thickness and the nodes may be spaced apart from each other in a plane of the microtruss by a distance to provide the carbon microstructure with an open volume ranging from about 70% to about 95%. At least one of the plurality of carbon segments may also include internal cracks. Moreover, a metal hydride may be embedded into the open volume of the carbon microstructure.

Yet another exemplary embodiment of the invention includes a method that includes the acts of providing a carbon microstructure comprising an open-cellular framework defined at least in part by a plurality of carbon segments that form repetitive and integrated unit cells such that the carbon microstructure has an open volume in the range of about 70 percent to about 95 percent, and embedding a metal hydride material into the open volume of the carbon microstructure.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Devices that consume hydrogen gas for power generation or for some other purpose need to store and be supplied with hydrogen gas in an effective way. For example, regarding hydrogen-consuming automobiles, it is estimated that approximately 5-13 Kg of hydrogen gas may be needed to enable a driving range of at least 300 miles using a fuel cell power plant, such as a PEM fuel cell stack, as the automobile's main energy generator. Other hydrogen-consuming devices, ranging from large stationary power plants to portable consumer devices, may have vastly different hydrogen feed requirements and may also operate at similar or quite different pressure and temperature conditions. A highly capable hydrogen storage material, however, can potentially benefit the wide range of hydrogen-consuming devices just mentioned.

A hydrogen storage material has been developed that comprises a metal hydride material embedded into a carbon microstructure. The carbon microstructure generally exhibits a greater thermal conductivity than its bulk metal hydride material surrounding. For instance, the carbon microstructure may achieve thermal conductivities of up to and in excess of about 10 $Wm^{-1}K^{-1}$ depending on its composition and construction while the thermal conductivity of the surrounding bulk metal hydride material is generally around 1-2 $Wm^{-1}K^{-1}$. The addition of at least one surface deposit of a relatively high thermally conductive material can further increase the thermal conductivity of the carbon microstructure, if desired. The carbon microstructure may be fabricated to have one or more forms of allotropic carbon as its main constituent; that is, the carbon microstructure may be formed (1) entirely of one or more allotropic forms of carbon or (2) from a combination of substances in which the one or more forms of allotropic carbon is the main constituent. In one embodiment, the carbon microstructure may be formed entirely or almost entirely of vitreous carbon. The weight percent of vitreous carbon in such a carbon microstructure may vary from about 90% to about 100% based on the total weight of the carbon microstructure (carbon content plus the at least one surface deposit, if applied). Other allotropic forms of carbon and/or the optional surface deposit(s) may constitute the remaining weight percent of the carbon microstructure if present.

The carbon microstructure may comprise an open-cellular framework of thermally conductive carbon throughout at least a portion of the embedded metal hydride material. Such an arrangement allows heat to be homogeneously transferred to and from the embedded metal hydride material at a greater rate and in a more thermally efficient manner than would normally be possible. The carbon microstructure may also be formed to have a relatively high open or void volume so that the inclusion of the carbon microstructure within the metal hydride material does not result in energy density losses that may depreciate the gains realized in thermal conductivity. A hydrogen storage material that includes a carbon microstructure having these attributes can help accelerate hydrogen sorption and desorption kinetics that, in turn, quickens the hydrogen charge and discharge times of the hydrogen storage material over the course of repeated cyclings. The need to subject the metal hydride material to expensive high-energy activation processes—such as pulverizing the metal hydride particles into small sized particles with oxide-free surfaces at a high temperature and pressure—may therefore be reduced or altogether eliminated, if desired. Many other results and benefits may also be achieved as will be known and understood by skilled artisans.

Figure 1:
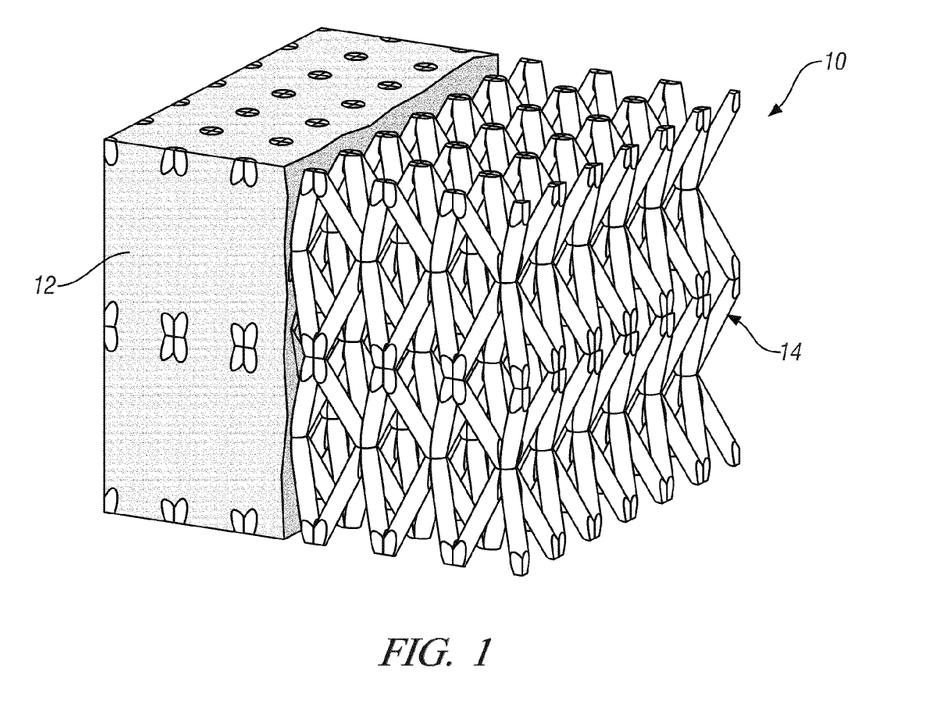
FIG. 1 is perspective view of a hydrogen storage material according to one embodiment of the invention.

Referring now to FIG. 1, there is shown one embodiment of a hydrogen storage material 10 that includes a metal hydride material 12 embedded into a carbon microstructure 14. The hydrogen storage material 10 may be situated inside a hydrogen storage tank to help facilitate the storage and delivery of hydrogen gas to an associated hydrogen-consuming device (not shown). But of course, the hydrogen storage material 10 may also be used in many other applications where hydrogen gas storage/release cycling is sought to be accomplished and/or managed.

The metal hydride material 12 may comprise at least one hydridable metal or alloy. Such hydridable metals and alloys have recently become popular because of their ability to reversibly sorb and desorb hydrogen gas at relatively modest temperatures and pressures. The relevant literature describes dozens of different simple, transitional, and complex hydridable metals and alloys that have been identified as promising candidates for hydrogen storage and delivery applications. Exemplary hydridable metals and alloys include, but are not limited to, magnesium metal (Mg) and alloys having the general formula $AB_5$, AB, $A_2B$, or $AB_2$ with A and B representing a variety of known metals. Some specific and commonly utilized alloys include $LaNi_5$, $Mg_2Ni$, FeTi, LiAl, NaAl, LiB, CaB, $CaMg_2$, $LaNi_3Co_2$, $ZrV_2$, and LiN. Some of these hydridable alloys may also be subjected to doping with, for example, aluminum or titanium, to help improve their volumetric and gravimetric hydrogen capacity. One example of such a doped hydridable alloy is $LaNi_{4.7}Al_{0.3}$. While the exemplary hydridable alloys just mentioned were listed using their elemental composition before hydrogen incorporation, it should be understood that the recitation of these alloys is also meant to encompass their respective hydride compounds (i.e., "$LaNi_5$" refers to both $LaNi_5$ and $LaNi_5H_6$ while "LiAl" refers to both LiAl and $LiAlH_4$, and so on). There are, of course, dozens of other hydridable metals and alloys that have been reported in the literature that may be used to construct the metal hydride material 12. Additional materials may also be included in the hydrogen storage material 10 such as, for example, an absorbent that can remove known or expected impurities from hydrogen gas.

The carbon microstructure 14 may, in one embodiment, embody an open-cellular framework that forms a network of thermally conductive carbon throughout the metal hydride material 12 or a desired portion of the metal hydride material 12; that is, the carbon microstructure 14 may be a generally porous and homogeneous three-dimensional physical microstructure defined at least in part by repetitive and integrated unit cells of a predetermined geometric configuration. Such an open-cellular framework may significantly improve the bulk thermal conductivity of the hydrogen storage material 10. This is because the extensive network of thermally conductive carbon extending throughout the metal hydride material 12 can transmit heat much better than the metal hydride material 12 itself. The kinetics of both the hydrogen sorption and desorption reactions that occur within the hydrogen storage material 10 may therefore be enhanced. For instance, an appreciable amount of the heat generated during the exothermic sorption of hydrogen gas can be extracted from anywhere within the bulk metal hydride material 12 and dissipated accordingly. Similarly, in the same fashion, heat can be homogeneously delivered throughout the metal hydride material 12 to help drive the endothermic hydrogen desorption reaction.

The open-cellular framework may further provide a relatively high open or void volume so that any gains achieved in the hydrogen storage material's 12 bulk thermal conductivity are not necessarily accompanied by a significant decrease in the amount of the metal hydride material 12 used to form the hydrogen storage material 10. The bulk thermal conductivity of the hydrogen storage material 10 can thus be improved without having to severely sacrifice the volumetric and gravimetric hydrogen storage capacity, and corresponding energy densities, of the hydrogen storage material 10. Additionally, the ability to achieve a relatively high open volume in the carbon microstructure 14 may ensure that hydrogen gas diffusion within the hydrogen storage material 10 is not overly restricted.

Figure 2:
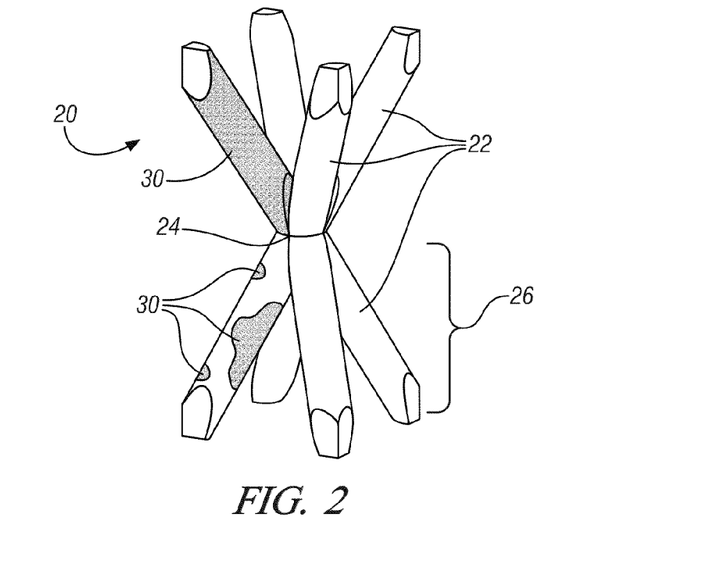
FIG. 2 is a perspective view of a unit cell of an open-cellular carbon microstructure according to one embodiment of the invention.
Figure 6:
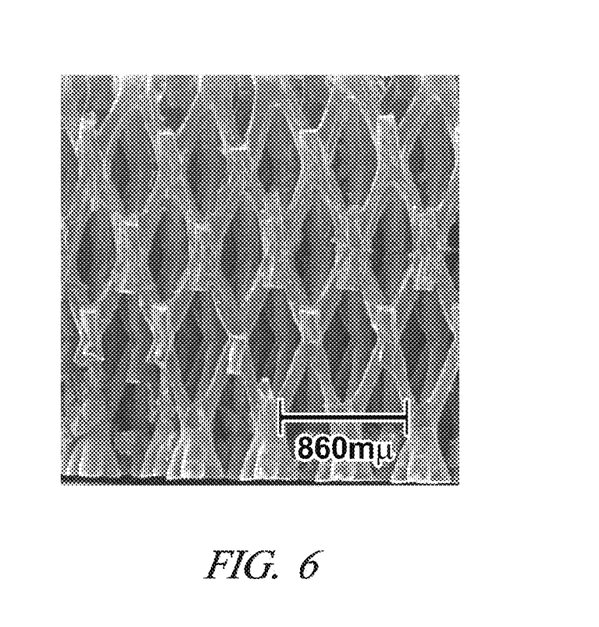
FIG. 6 is a scanning electron micrograph of a portion of an open-cellular carbon microstructure according to one embodiment of the invention.

In one embodiment, as shown in FIG. 1, the open-cellular framework of the carbon microstructure 14 may be a three-dimensional integrated microtruss. The microtruss, a unit cell 20 of which is shown in FIG. 2, may include carbon segments 22 of any cross-sectional shape that meet at spaced apart and aligned nodes 24. As shown, for example, each unit cell 20 may encompass four circular carbon segments 22 that convene and interpenetrate each other at one of the nodes 24 to form opposed quadrilateral pyramidal halves 26. The nodes 24 of the integrated microstruss may be aligned in both vertical and horizontal planes. FIG. 6 shows a scanning electron micrograph of a portion of an actual integrated carbon microtruss similar to that shown illustratively in FIGS. 1 and 2.

The thickness (diameter if the segments are circular) of the carbon segments 22 may range from about 1 μm to about 500 μm. The spacing between adjacent nodes 24 in the same plane—either vertical or horizontal—may range from about 10 μm to about 5 mm. Such dimensions can provide the unit cell 20, and thus the full carbon microstructure 14, with an open volume ranging from about 70 percent to about 95 percent and a corresponding volumetric density of about 0.07 g/cm$^3$ to about 0.60 g/cm$^3$. The thickness of the carbon segments 22 and the spacing between adjacent nodes 24 can be varied to adjust the open volume of the carbon microstructure 14, if desired.

The volumetric density of the carbon microstructure 14, moreover, can be affected in a predicable manner by managing its open volume and carbon content. For example, the carbon microstructure 14 will generally possess a volumetric density at or near 0.50 g/cm$^3$ when formed almost entirely of vitreous carbon and with an open volume around 70%. Decreasing the vitreous carbon content in favor of heavier allotropic forms of carbon will tend to increase the volumetric density of the carbon microstructure 14 while, on the other hand, increasing the open volume will tend to decrease the volumetric density of the carbon microstructure 14. Indeed, as another example, the carbon microstructure 14 will generally possess a volumetric density at or near 0.07-0.08 g/cm$^3$ when formed almost entirely of vitreous carbon and with an open volume around 95%.

Figure 3:
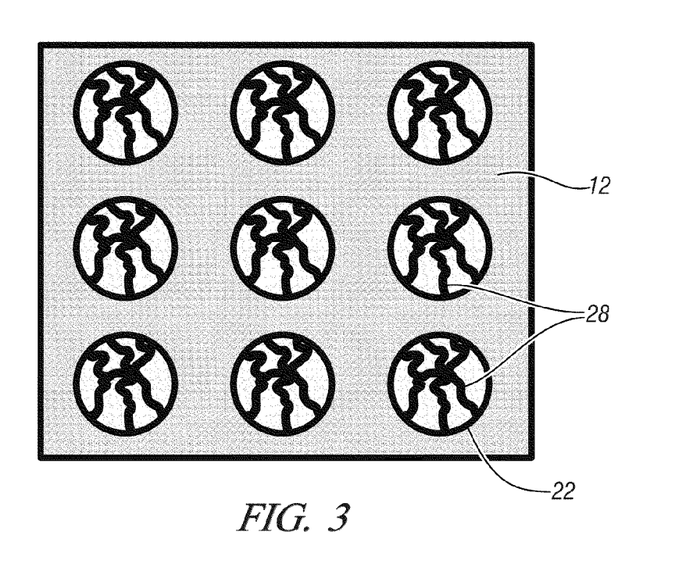
FIG. 3 is an illustrative and fragmentary cross-sectional plan view of a hydrogen storage material according to one embodiment of the invention.

Some or all of the carbon segments 22 may further include internal cracks 28 as best shown in the schematic cross-sectional plan view illustrated in FIG. 3. The internal cracks 28 may extend longitudinally, both longitudinally and transversely, or even somewhat randomly through the carbon segments 22. The internal cracks 28 may render the carbon segments 22, and thus the carbon microstructure 14 as a whole, internally porous and thus amenable to internal hydrogen gas diffusion. Such an attribute of the carbon microstructure 14 may further enable hydrogen gas diffusion within the hydrogen storage material 10 on a scale comparable to an increase in open volume; that is, the internal cracks 28 give the perception that the carbon microstructure 14 has a larger open volume than it actually does. The internal cracks 28 may be formed in the carbon segments 22 during preparatory quenching of the hydrogen storage material 10, as described further below.

The carbon microstructure 14 may also comprise at least one surface deposit 30 of a relatively high thermally conductive material to help further enhance its thermal conductivity and/or surface interaction with the embedded metal hydride material 12 (or hydridable metal or alloy precursor materials). Some examples of a relatively high thermally conductive material include, but are not limited to, nickel, gold, copper, and aluminum. The addition of the at least one surface deposit 30 will increase slightly the volumetric density of the carbon microstructure 14 in proportion to the product of the volumetric density of the particular high thermally conductive material and the weight percent at which it is employed.

In one embodiment, the at least one surface deposit 30 may be a plurality of small clusters of the relatively high thermally conductive material on the surface of at least one of the carbon segments 22 (as shown in FIG. 2 on the lower left carbon segment). The entire carbon microstructure 14 may include these small clusters of the relatively high thermally conductive material. But in some instances only select portions of the carbon microstructure 14 may be targeted. The small clusters of the relatively high thermally conductive material may, depending on the extent of its application, collectively constitute about 0.1 to about 10 weight percent of the carbon microstructure based on the total combined weight of the carbon microstructure and the at least one surface deposit 30. The small clusters of the relatively high thermally conductive material may be applied to the at least one carbon segment 22 of the carbon microstructure 14 by any suitable procedure known to skilled artisans including evaporative deposition and magnetron sputtering.

In another embodiment, the at least one surface deposit 30 may be a thin continuous coating of the relatively high thermally conductive material on the surface of at least one of the carbon segments 22 (as shown in FIG. 2 on the upper left carbon segment). The entire carbon microstructure 14 may be coated so that the vast majority of the carbon microstructure 14 is encapsulated by the relatively high thermally conductive material. But in some instances, as before, only select portions of the carbon microstructure 14 may be targeted. The continuous coating of the relatively high thermally conductive material may, depending on the extent of its application, collectively constitute about 0.1 to about 10 weight percent of the carbon microstructure based on the total combined weight of the carbon microstructure and the at least one surface deposit 30. The continuous coating of the relatively high thermally conductive material may be applied to the at least one carbon segment 22 of the carbon microstructure 14 by electroplating or any other suitable procedure known to skilled artisans.

The carbon microstructure 14 that comprises the integrated microtruss shown in FIGS. 1-2 may be fabricated, prior to embedment with the metal hydride material 12, by any procedure known to skilled artisans. For instance, in one embodiment, a polymer template that is identical or nearly identical in shape to the desired integrated microtruss may be provided and then carbonized to form the carbon microstructure 14. Additional intermediate acts may be performed, if desired, to help improve the carbon yield of the carbon microstructure 14.

The polymer template may be provided by a method that forms a three-dimensional polymer microstructure by curing self-propagating optical polymer waveguides from a photopolymer. Such a method may involve supplying a plurality of collimated light beams into a reservoir containing a photopolymer that polymerizes at the wavelength of the collimated light beams. Examples of suitable photopolymers include, but are not limited to, free-radical polymers such as urethanes, acrylates, methacrylates, and cationic polymers such as photo-cured epoxies. The collimated light beams may be formed by passing light from a light source through an interjacent mask having a plurality of patterned apertures. The patterned mask may direct the plurality of light beams into the photopolymer so that they intersect to resemble the integrated microtruss that is to be formed.

Upon exposure to the photopolymer, the collimated light beams initiate polymerization and cause self-propagating polymer waveguides to form along the path of the plurality of light beams due to refractive index changes that occur during polymerization. These self-propagating polymer waveguides eventually grow and intersect with one another to form the polymer template. The size and shape of the polymer template, including the thickness and spacing of the polymer waveguides, can be dictated by controlling one or more parameters such as the size of the plurality of apertures in the mask, the angle of the plurality of collimated light beams through the mask, the intensity and exposure time of the photopolymer to the plurality of collimated light beams, and the particular photopolymer used, to name but a few. A more complete and detailed discussion of this process for making the polymer can be found in U.S. Pat. No. 7,382,959, which is assigned to HRL Laboratories.

The polymer template may then be carbonized—the thermal decomposition of the polymer waveguides into carbon by pyrolysis—to form the integrated microtruss of the carbon microstructure 14. Generally, temperatures of greater than 600° C., and usually greater than 800° C., are appropriate to carbonized most polymer materials in an inert atmosphere. A number of allotropic form of carbon, including vitreous carbon, can be produced through carbonization as understood by skilled artisans.

Various techniques, however, are known to skilled artisans that can help improve the carbon yield (the mass % carbon derived from the polymer material) of such carbonization procedures. For instance, in one embodiment, the polymer template may first be immersed in a reservoir of a liquid monomer so that the liquid monomer can diffuse into and swell the polymer waveguides of the polymer template. The liquid monomer may be any monomer that can diffuse into the polymer waveguides and polymerize into a high-carbon yielding polymer. An example of such a monomer is acrylonitrile. A small amount of a free radical initiator (heat or UV light triggered) may also be included in the reservoir with the liquid monomer. Next, the polymer template may be removed from the liquid monomer reservoir and heated or exposed to UV light (depending on the free radical initiator used) to polymerize the liquid monomer infused in the polymer template. The polymer template may then be heat stabilized (200° C.-400° C.) in an oxidizing environment and afterwards carbonized (greater than 600° C. and usually greater than 800° C.) in an inert environment to form the carbon microstructure 14 defined by an integrated microtruss. A more complete and detailed discussion of this process can be found in U.S. application Ser. No. 11/870,379, assigned to HRL Laboratories and entitled Ordered Open-Cellular Carbon Microstructure and Method of Making the Same.

The metal hydride material 12 may then be embedded into the carbon microstructure 14 to form the hydrogen storage material 10 in a variety of ways.

Figure 4:
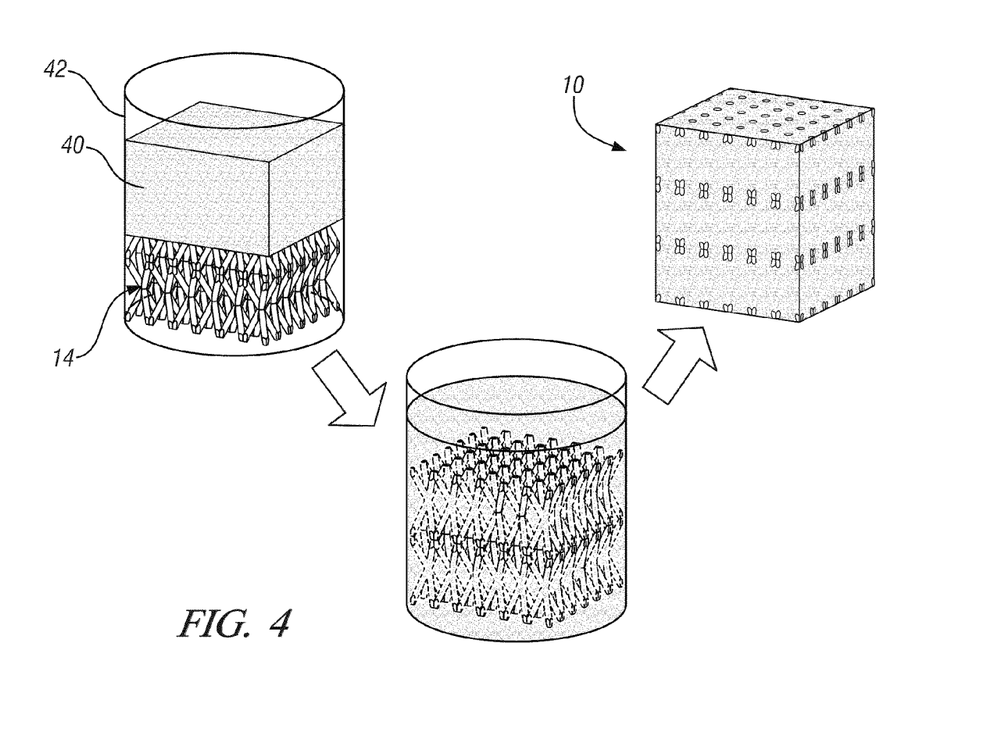
FIG. 4 is a schematic process flow diagram showing the formation of a hydrogen storage material according to one embodiment of the invention.

In one embodiment, as shown schematically in FIG. 4, a hydridable metal or alloy precursor 40 may be melted into the carbon microstructure 14 and then hydrogenated. Such an embedment procedure may involve first placing the hydridable metal or alloy precursor 40 in block or bulk form into a high-temperature boat 42 that contains the carbon microstructure 14. The carbon microstructure 14 may be prepared as already described and may further include surface compounds, if desired. The hydridable metal or alloy precursor 40 may then be melted so that it flows into and fills the open volume of the carbon microstructure 14. The use of a hydridable metal or alloy precursor 40 that melts below the temperature at which the carbon microstructure 14 begins to structurally weaken or distort may be preferable. For instance, a hydridable metal or alloy precursor 40 that melts below about 1600° C. may be appropriate.

Next, the molten hydridable metal or alloy may be cooled. The cooling procedures utilized may be chosen in order to obtain the maximum interaction between the carbon microstructure 14 and the now-infused and solidified hydridable metal or alloy precursor 40. At this point, the hydridable metal or alloy precursor 40 may be hydrogenated to form the metal hydride material 12. For example, in one embodiment, the hydridable metal or alloy precursor 40 may be exposed to a hydrogen gas under high pressures and corresponding temperatures in an inert environment and then quenched (the continuous cycling of hydrogen gas sorption and desorption). The quenching of the hydridable metal or alloy precursor 40 progressively produces more metal hydride compounds and eventually forms the metal hydride material 12 having an appropriate hydrogen gas storage capacity. This quenching process, moreover, can initiate and propagate the internal cracks 28 in the individual carbon segments 22 through cyclic stresses imparted to the carbon microstructure 14. Similar cracking may also occur in the bulk solidified metal hydride material 12, which has the beneficial effect of exposing fresh carbon surfaces to help the hydrogen storage material 10 achieve optimal thermal conductive and hydrogen gas diffusion properties.

The hydrogen storage material 10 formed by the process of FIG. 4 may now be incorporated into a hydrogen storage tank. The hydrogen storage material 10 may be used in its as-formed state or it may be mechanically crushed into smaller blocks or chunks each having a portion of the originally-formed carbon microstructure 14 with an embedded amount of the metal hydride material 12. The hydrogen storage material 10, whether comprised of one or multiple pieces, may be polished to further expose fresh surfaces of the carbon microstructure 14 if desired.

Figure 5:
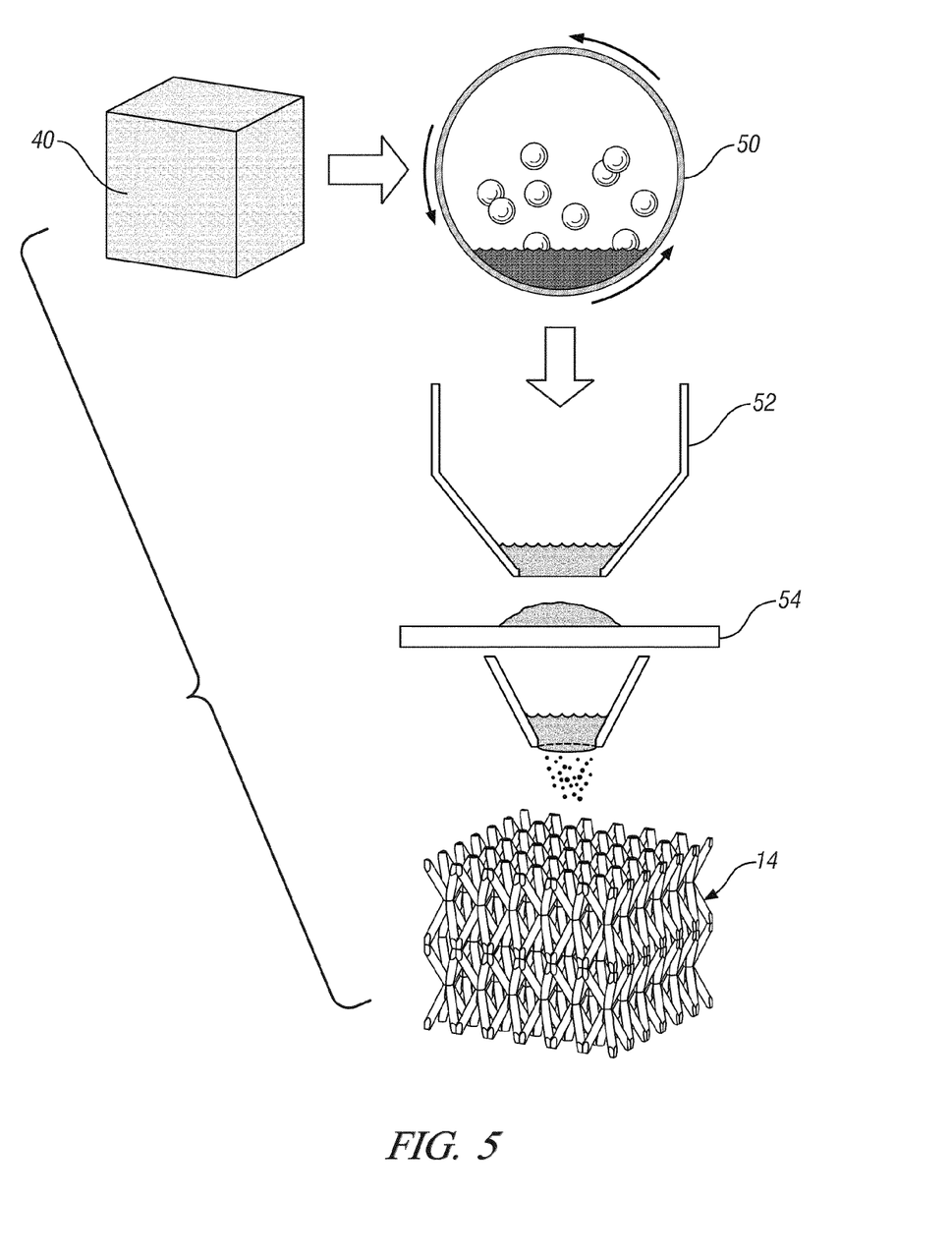
FIG. 5 is a schematic process flow diagram showing the formation of a hydrogen storage material according to one embodiment of the invention.

In another embodiment, as shown schematically in FIG. 5, the metal hydride material precursor 40 may be charged into the carbon microstructure 14 as a coarse or fine powder. Such an embedment procedure may involve first placing the hydridable metal or alloy precursor 40 into a ball mill grinder 50 or other appropriate device to grind the hydridable metal or alloy precursor 40 into a powder of a predetermined refinement. The powderized hydridable metal or alloy precursor 40 may then be charged to a hopper 52 and filtered into the carbon microstructure 14 with the aid of a vibrating table 54. Afterwards, an additional pressurizing process may be employed to increase the surface contact between the carbon microstructure 14 and powdered metal or alloy precursor 40. The carbon microstructure 14, as in the previous embodiment, may be prepared as already described and may further include surface compounds if desired. Next, the powderized hydridable metal or alloy precursor 40 may be hydrogenated by the same quenching process described earlier. This quenching process again forms the metal hydride material 12 with an appropriate hydrogen gas storage capacity as well as forming the internal cracks 28 in the individual carbon segments 22 of the carbon microstructure 14.

The efficacy of the hydrogen storage material 10 that has been developed may be a more clearly shown by comparison with previously known hydrogen storage mediums that sought to improve bulk thermal conductivity.

First off, as alluded to before, bulk metal hydrides generally possess a low thermal conductivity during hydrogen gas cycling in the vicinity of about $1\text{-}2\,\text{Wm}^{-1}\text{K}^{-1}$. Such a low bulk thermal conductivity can create some performance and practicality issues. For example, complete or near complete hydrogen gas sorption by the metal hydride material may be frustrated. This is because the heat generated during the exothermic hydrogen sorption reaction may not be removed fast enough to prevent an increase in bulk metal hydride material temperature and an offsetting release of hydrogen gas. Put differently, the sorption of hydrogen gas generates heat which becomes trapped in the bulk metal hydride material and eventually causes some or all of the just-captured hydrogen gas to be released. Other issues related to poor bulk thermal conductivity include slow overall sorption and desorption kinetics leading to long charge/discharge times and the need to used costly and complicated activation processes to try and improve those kinetics.

Some techniques that have been devised to try and improve the thermal conductivity of bulk metal hydride materials involve mixing other high thermally conductive inert metal additives—such as aluminum (237 $Wm^{-1}K^{-1}$) and copper (401 $Wm^{-1}K^{-1}$)—into the metal hydride material. A drawback of these techniques, however, is that a large amount of inert and non-hydrogen-storing additives are needed to achieve significant thermal conductive gains. For example, as much as 10 to 20 weight percent of inert metal additives may be required to raise the bulk metal hydride material's thermal conductivity to the general magnitude of about 2 to 35 $Wm^{-1}K^{-1}$. Such a high concentration of inert metal additives, while improving thermal conductivity, has the adverse effect of significantly reducing the bulk metal hydride material's overall hydrogen storage capacity and energy density. Another drawback of these techniques is that the solid-state of inert metal additives decreases the overall porosity of the metal hydride material and thus limits hydrogen gas diffusion.

The hydrogen storage material 10, on the other hand, as previously mentioned, can be formed by embedding the metal hydride material 12 into the carbon microstructure 14 which may possess as much as 95% open volume and a corresponding volumetric density of about 0.07-0.80 $g/cm^3$ (Near 100% vitreous carbon and no surface deposit(s) 30). The volumetric density of such a carbon microstructure 14 may be raised slightly to approximately 0.83 $g/cm^3$ if aluminum is added as a surface deposit(s) in a quantity that brings the aluminum weight percent of the carbon microstructure to about 10% based on the total weight of the carbon microstructure 14. This modest increase in density may be acceptable in view of the corresponding increase in thermal conductivity ascribed to the aluminum.

Thus, in one example, where the hydrogen storage material 10 comprises the carbon microstructure 14 defined by an integrated microtruss embedded with $LaNi_5$ (density of 7.17 $g/cm^3$), the total gravimetric and volumetric loss of $LaNi_5$ in the hydrogen storage material 10 due to the presence of the carbon microstructure 14 may be as low as about 3.2% and 10%, respectively. Moreover, the internal cracks 28 in the carbon segments 22 may result in the hydrogen storage material 10 operating as if those volume and weight percent losses were actually lower. The presence or absence of an aluminum (or other material) surface deposit(s) on the carbon microstructure 14 is not particularly relevant here since the overall volume of the carbon microstructure 14 is not significantly affected in either instance. But when the same metal hydride material ($LaNi_5$) is mixed with aluminum at its lower effective weight percent range (10% of the aluminum/metal hydride mixture), the estimated gravimetric and volumetric loss of the metal hydride material is estimated at about 10% and 22.8%, respectively. The effects of decreasing the open volume of the carbon microstructure 14 (which decreases the volume percentage of $LaNi_5$ in the hydrogen storage material 10) and increasing the amount of the aluminum additive (which also decreases the volume percentage of $LaNi_5$ for the metal hydride material mixed with aluminum) for their respective purposes is shown below in Tables 1-2 and in the graph of FIG. 7.

TABLE 1

Figure 7:
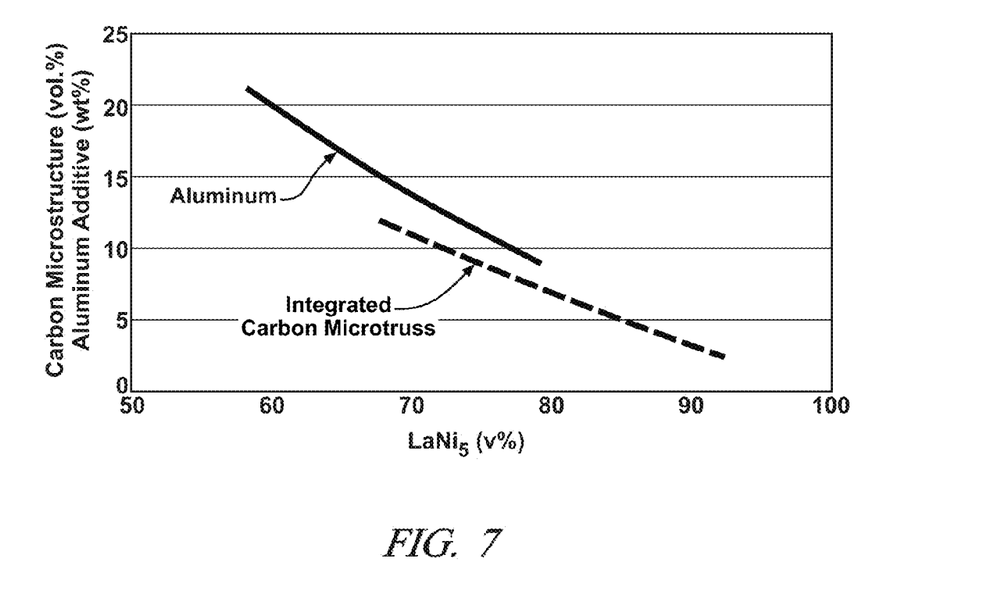
FIG. 7 is a graph showing the volumetric percent of a metal hydride material in a hydrogen storage material as a function of the volume percent of an open-cellular carbon microstructure according to one embodiment of the invention and, for comparison purposes, the weight percent of an aluminum additive needed to achieve a comparable bulk thermal conductivity.

| Carbon integrated microtruss | | | |
|---|---|---|---|
| $LaNi_5$ (vol. %) | 90 | 80 | 70 |
| C (vol. %) | 3.2 | 6.8 | 11.1 |
| $LaNi_5$ (wt. %) | 96.8 | 93.2 | 88.9 |

TABLE 2

| Aluminum additives | | | |
|---|---|---|---|
| Al (wt. %) | 10 | 15 | 20 |
| Al (vol. %) | 22.8 | 31.9 | 39.9 |
| $LaNi_5$ (vol. %) | 77.2 | 68.1 | 60.1 |

As can be seen, the gravimetric and volumetric losses of $LaNi_5$ are much less for the hydrogen storage material 10 which comprises $LaNi_5$ embedded in the carbon microstructure 14 defined by an integrated microtruss. The hydrogen storage material 10 may experience a roughly 3.2% to 11.1% gravimetric density loss and a 10% to 30% volumetric density loss of $LaNi_5$ while the addition of aluminum additives in an amount that produces at least comparable gains in thermal conductivity results in a roughly 10% to 20% gravimetric density loss and a 22.8% to 39.9% volumetric density loss of $LaNi_5$. The carbon microstructure 12 can therefore help improve the bulk thermal conductivity of a metal hydride material while minimizing associated energy density losses.

The above description of various embodiments of the invention is merely exemplary in nature and is not intended to limit the scope of the invention, its application, or its uses.

What is claimed is:

1. A product comprising:
    a carbon microstructure comprising an open-cellular framework defined at least in part by a plurality of carbon segments that form repetitive and integrated unit cells such that the carbon microstructure has an open volume in the range of about 70 percent to about 95 percent, and
    a metal hydride material embedded into the open volume of the carbon microstructure;
    wherein the carbon microstructure is more thermally conductive than the metal hydride material; and
    wherein the carbon microstructure is formed from at least 90 weight percent vitreous carbon based on the total weight of the carbon microstructure.

2. A product as set forth in claim 1, wherein the metal hydride material comprises at least one hydridable metal or alloy.

3. A product as set forth in claim 1, wherein the carbon microstructure has a volumetric density ranging from about 0.07 $g/cm^3$ to about 0.60 $g/cm^3$.

4. A product as set forth in claim 1, wherein the open-cellular framework comprises a three-dimensional microtruss in which the plurality of carbon segments interpenetrate at spaced apart and aligned nodes such that the unit cells of the microtruss comprise four carbon segments that interpenetrate at one of the nodes to form opposed quadrilateral pyramidal halves.

5. A product as set forth in claim 4, wherein the carbon segments are circular in cross-section and have a diameter ranging from about 1 μm to about 500 μm.

6. A product as set forth in claim 4, wherein the nodes are spaced apart from each other in a plane of the microtruss the by a distance ranging from about 10 μm to about 5 mm.

7. A product as set forth in claim 1, wherein at least one of the carbon segments comprises internal cracks.

8. A product as set forth in claim 1, wherein the metal hydride material is doped to improve volumetric and gravimetric hydrogen capacity.

9. A product as set forth in claim 8, wherein doping includes doping with aluminum or titanium.

10. A product comprising:
a carbon microstructure comprising an open-cellular framework defined at least in part by a plurality of carbon segments that form repetitive and integrated unit cells such that the carbon microstructure has an open volume in the range of about 70 percent to about 95 percent, and
a metal hydride material embedded into the open volume of the carbon microstructure;
wherein the carbon microstructure is more thermally conductive than the metal hydride material, wherein the carbon microstructure further comprises at least one surface deposit of a relatively high thermally conductive material, and wherein the surface deposit is present from about 0.1 to about 10 weight percent based on the total weight of the carbon microstructure.

11. A product as set forth in claim 10, wherein the relatively high thermally conductive material comprises at least one or aluminum, copper, nickel, or combinations thereof.

12. A product as set forth in claim 10, wherein the at least one surface deposit comprises a plurality of small clusters of the relatively high thermally conductive material on at least one of the carbon segments.

13. A product as set forth in claim 10, wherein the at least one surface deposit comprises a thin continuous coating of the relatively high thermally conductive material on at least one of the carbon segments.

14. A product as set forth in claim 13, wherein the entire carbon microstructure is electroplated with the relatively high thermally conductive material.

15. A product as set forth in claim 14, wherein the metal hydride material comprises at least one alloy having the general formula $AB_5$, $AB$, $A_2B$, or $AB_2$, where A and B represent a metal element.

16. A product comprising:
a carbon microstructure comprising an open-cellular framework defined at least in part by a plurality of carbon segments that interpenetrate at spaced apart and aligned nodes to form a three-dimensional microtruss having repetitive and integrated unit cells, the carbon microstructure comprising at least 90 weight percent vitreous carbon based on the total weight of the carbon microstructure, the unit cells of the three-dimensional microtruss comprising four carbon segments that interpenetrate at one of the nodes to form opposed quadrilateral pyramidal halves, the plurality of carbon segments having a thickness and the nodes being spaced apart from each other in a plane of the microtruss by a distance to provide the carbon microstructure with an open volume ranging from about 70% to about 95%, and wherein at least one of carbon segments has internal cracks; and
a metal hydride material embedded into the carbon microstructure wherein the carbon microstructure further comprises at least one surface deposit of a relatively high thermally conductive material.

17. A product as set forth in claim 16, wherein the surface deposit is present from about 0.1 to about 10 weight percent based on the total weight of the carbon microstructure.

18. A product as set forth in claim 17, wherein the at least one surface deposit comprises either a plurality of small clusters of the relatively high thermally conductive material on at least one of carbon segments or a thin continuous coating of the relatively high thermally conductive material on at least one of carbon segments.

19. A method comprising:
providing a carbon microstructure comprising an open-cellular framework defined at least in part by a plurality of carbon segments that form repetitive and integrated unit cells such that the carbon microstructure has an open volume in the range of about 70 percent to about 95 percent, and
embedding a metal hydride material into the open volume of the carbon microstructure and wherein the act of embedding the metal hydride material comprises hydrogenating the hydridable metal or alloy precursor material to incorporate hydrogen into the hydridable metal or alloy precursor material and form the metal hydride material with a hydrogen storage capacity and wherein the carbon microstructure is formed from at least 90 weight percent vitreous carbon based on the total weight of the carbon microstructure.

20. A product comprising:
a carbon microstructure comprising an open-cellular framework defined at least in part by a plurality of carbon segments that interpenetrate at spaced apart and aligned nodes to form a three-dimensional microtruss having repetitive and integrated unit cells, the carbon microstructure comprising at least 90 weight percent vitreous carbon based on the total weight of the carbon microstructure, the unit cells of the three-dimensional microtruss comprising four carbon segments that interpenetrate at one of the nodes to form opposed quadrilateral pyramidal halves, the plurality of carbon segments having a thickness and the nodes being spaced apart from each other in a plane of the microtruss by a distance to provide the carbon microstructure with an open volume ranging from about 70% to about 95%, and wherein at least one of carbon segments has internal cracks; and
a metal hydride material embedded into the carbon microstructure, wherein the carbon microstructure has a volumetric density ranging from about 0.07 $g/cm^3$ to about 0.60 $g/cm^3$, wherein the thickness of the carbon segments ranges from about 1 μm to about 500 μm, and wherein the distance the nodes are spaced apart from each other in a plane of the microtruss ranges from about 10 μm to about 5 mm.

21. A method as set forth in claim 19, wherein the act of embedding the metal hydride material comprises:
grinding a hydridable metal or alloy precursor material into a powder of a predetermined refinement;
embedding the powder of the hydridable metal or alloy precursor material into the carbon microstructure; and
hydrogenating the hydridable metal or alloy precursor material to incorporate hydrogen into the hydridable metal or alloy precursor material and form the metal hydride material with a hydrogen storage capacity.

22. A method comprising:
providing a carbon microstructure comprising an open-cellular framework defined at least in part by a plurality of carbon segments that form repetitive and integrated unit cells such that the carbon microstructure has an open volume in the range of about 70 percent to about 95 percent, and
embedding a metal hydride material into the open volume of the carbon microstructure, wherein the act of embedding the metal hydride material comprises:
melting a hydridable metal or alloy precursor material into the carbon microstructure;
cooling the hydridable metal or alloy precursor material; and
hydrogenating the hydridable metal or alloy precursor material to incorporate hydrogen into the hydridable metal or alloy precursor material and form the metal hydride material with a hydrogen storage capacity.

23. A product comprising:
a carbon microstructure comprising an open-cellular framework defined at least in part by a plurality of carbon segments that form repetitive and integrated unit cells comprising a three-dimensional microtruss such that the carbon microstructure has an open volume in the range of about 70 percent to about 95 percent, and
a metal hydride material embedded into the open volume of the carbon microstructure;
wherein the carbon microstructure is more thermally conductive than the metal hydride material;
wherein the carbon microstructure further comprises at least one surface deposit of a relatively high thermally conductive material, and wherein the surface deposit is present from about 0.1 to about 10 weight percent based on the total weight of the carbon microstructure.

24. A product set forth in claim 23, wherein the plurality of carbon segments are cross-sectionally shaped so that they meet at spaced apart and aligned nodes.

25. A product as set forth in claim 23, wherein the carbon microstructure is formed from at least 90 weight percent vitreous carbon based on the total weight of the carbon microstructure.

26. A product as set forth in claim 23, wherein the carbon microstructure has a volumetric density ranging from about 0.07 g/cm$^3$ to about 0.60 g/cm$^3$.

27. A product as set forth in claim 23, wherein at least one of the carbon segments comprises internal cracks.

28. A product as set forth in claim 23, wherein the relatively high thermally conductive material comprises at least one or aluminum, copper, nickel, or combinations thereof.

29. A product as set forth in claim 23, wherein the at least one surface deposit comprises a plurality of small clusters of the relatively high thermally conductive material on at least one of the carbon segments.

30. A product as set forth in claim 23, wherein the at least one surface deposit comprises a thin continuous coating of the relatively high thermally conductive material on at least one of the carbon segments.

31. A product as set forth in claim 30, wherein the entire carbon microstructure is electroplated with the relatively high thermally conductive material.

32. A product as set forth in claim 31, wherein the metal hydride material comprises at least one alloy having the general formula $AB_5$, $AB$, $A_2B$, or $AB_2$, where A and B represent a metal element.

33. A product as set forth in claim 23, wherein the metal hydride material comprises at least one hydridable metal or alloy.

* * * * *